(12) United States Patent
Jung

(10) Patent No.: US 6,831,438 B2
(45) Date of Patent: Dec. 14, 2004

(54) METHOD AND APPARATUS FOR CONTROLLING DC MOTOR

(75) Inventor: Young-do Jung, Gyeonggi-doi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/608,063

(22) Filed: Jun. 30, 2003

(65) Prior Publication Data

US 2004/0108828 A1 Jun. 10, 2004

(30) Foreign Application Priority Data

Jul. 6, 2002 (KR) .................................. 10-2002-39153

(51) Int. Cl.[7] .................................................. G05B 1/06
(52) U.S. Cl. ....................... 318/652; 318/615; 318/618; 318/610; 318/561
(58) Field of Search .............................. 318/652, 615, 318/618, 610, 561

(56) References Cited

U.S. PATENT DOCUMENTS

| 4,777,609 A | | 10/1988 | Cavill et al. | |
| 4,893,068 A | * | 1/1990 | Evans, Jr. | .................. 318/615 |
| 6,304,408 B1 | * | 10/2001 | Cole | ..................... 360/77.02 |

FOREIGN PATENT DOCUMENTS

JP    6-286276    10/1994

* cited by examiner

*Primary Examiner*—Karen Masih
(74) *Attorney, Agent, or Firm*—Staas & Halsey LLP

(57) ABSTRACT

Controlling a direct current motor driving an object by determining, if the object does not reach a target position, a reference velocity corresponding to a point of time from a predetermined velocity trajectory, obtaining a position of the object, calculating a current velocity of the object, and calculating a difference between the reference velocity and the current velocity. If the calculated difference is greater than a velocity error limit value, informing a user that an error has occurred.

16 Claims, 5 Drawing Sheets

METHOD AND APPARATUS FOR CONTROLLING DC MOTOR

CROSS-REFERENCE TO RELATED APPLICATIONS

This application claims the benefit of Korean Patent Application No. 2002-39153 filed on Jul. 6, 2002 in the Korean Intellectual Property Office, the disclosure of which is incorporated herein in its entirety by reference.

BACKGROUND OF THE INVENTION

1. Field of the Invention

The present invention relates to a direct current (DC) motor, and more particularly, to a method and an apparatus for controlling an object driven by a DC motor.

2. Description of the Related Art

An inkjet printer or a multi-function peripheral generally uses a DC motor or a step motor to drive a carrier having a head as a driven object. In particular, when the carrier is driven by the DC motor, interference may occur in the carrier due to a user or other external factors. In this case, even if interference is very serious, a conventional method of controlling the motor cannot stop the motor that is operating and cannot inform a user of this situation. In other words, the conventional motor controlling method continues to increase the duty cycle of a pulse width modulation (PWM) signal that controls the motor to overcome an external interference. Nevertheless, if the position of the object driven by the DC motor, i.e., the position of the carrier, does not reach a target position, the object is regarded as having an error. However, typically, because of such an external interference, a print paper may be torn during the continuous attempt to move the carrier.

The conventional motor controlling method attempts to change the position of the object using only information on the position of the object, and not information on the velocity of the object. In particular, when an external interference occurs during the operation of the DC motor, the conventional motor control method continuously increases the duty cycle of the PWM even though not needed, which causes other errors/problems, such as a paper tear, etc. Thus, the conventional motor control method does not sensitively check whether an error has occurred in the object (i.e., the conventional method does not detect a driven object error according to the object velocity in a time period). In particular, detecting a velocity error based upon the PWM signal would be low, because the output value of the PWM signal is maximized to overcome the external interference. In addition, if an external interference causes the motor object not to reach the target position during the driving of the DC motor, because the duty cycle of the PWM signal continues to increase to change, or attempt to change, the position of the object, a substantial amount of power is consumed.

SUMMARY OF THE INVENTION

Accordingly, the present invention provides a method of controlling a DC motor such that when an object driven by the DC motor errs due to an external interference, the error can be sensed and a user can be informed of this error, and additionally, the operating of the DC motor can be stopped.

The present invention also provides an apparatus performing the DC motor controlling method of the present invention.

Additional aspects and advantages of the invention will be set forth in part in the description which follows and, in part, will be obvious from the description, or may be learned by practice of the invention.

The present invention may be achieved by a method of controlling a direct current motor driving an object, comprising if the object does not reach a target position, detecting from a predetermined velocity trajectory a reference velocity corresponding to a point of time when a first interrupt occurs, obtaining the position of the object, calculating a current velocity of the object updated whenever a second interrupt occurs (i.e., an updated current velocity in relation to the time of the first interrupt), and calculating a difference between the reference velocity and the current velocity, determining whether the difference is greater than a velocity error limit value, and if determined that the difference is greater than the velocity error limit value, informing a user that an error occurs.

The present invention may be also achieved by an apparatus controlling a direct current motor driving an object, comprising a buffer, a first comparator, a reference velocity detector, a position detector, a current velocity calculator, a difference detector, a second comparator, and an error informer. The buffer buffers and outputs a position of the object. The first comparator compares the position of the object input from the buffer with a target position in response to a first control signal and a first interrupt signal and outputs the comparison result as a second control signal. The reference velocity detector detects from a predetermined velocity trajectory a reference velocity corresponding to a point of time when the first interrupt signal occurs, in response to the second control signal and the first interrupt signal. The position detector detects the position of the object in response to the second control signal and the first interrupt signal and outputs the detected position of the object to the buffer. The current velocity calculator calculates a current velocity of the object updated whenever a second interrupt signal occurs in response to the second control signal and the first interrupt signal. The difference detector calculates and outputs a difference between the reference velocity and the current velocity. The second comparator compares the difference with a velocity error limit value and outputs the comparison result as a third control signal. The error informer informs a user that an error occurs in response to the third control signal. According to an aspect of the present invention, the second interrupt signal occurs more frequently than the first interrupt signal.

BRIEF DESCRIPTION OF THE DRAWINGS

The above and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
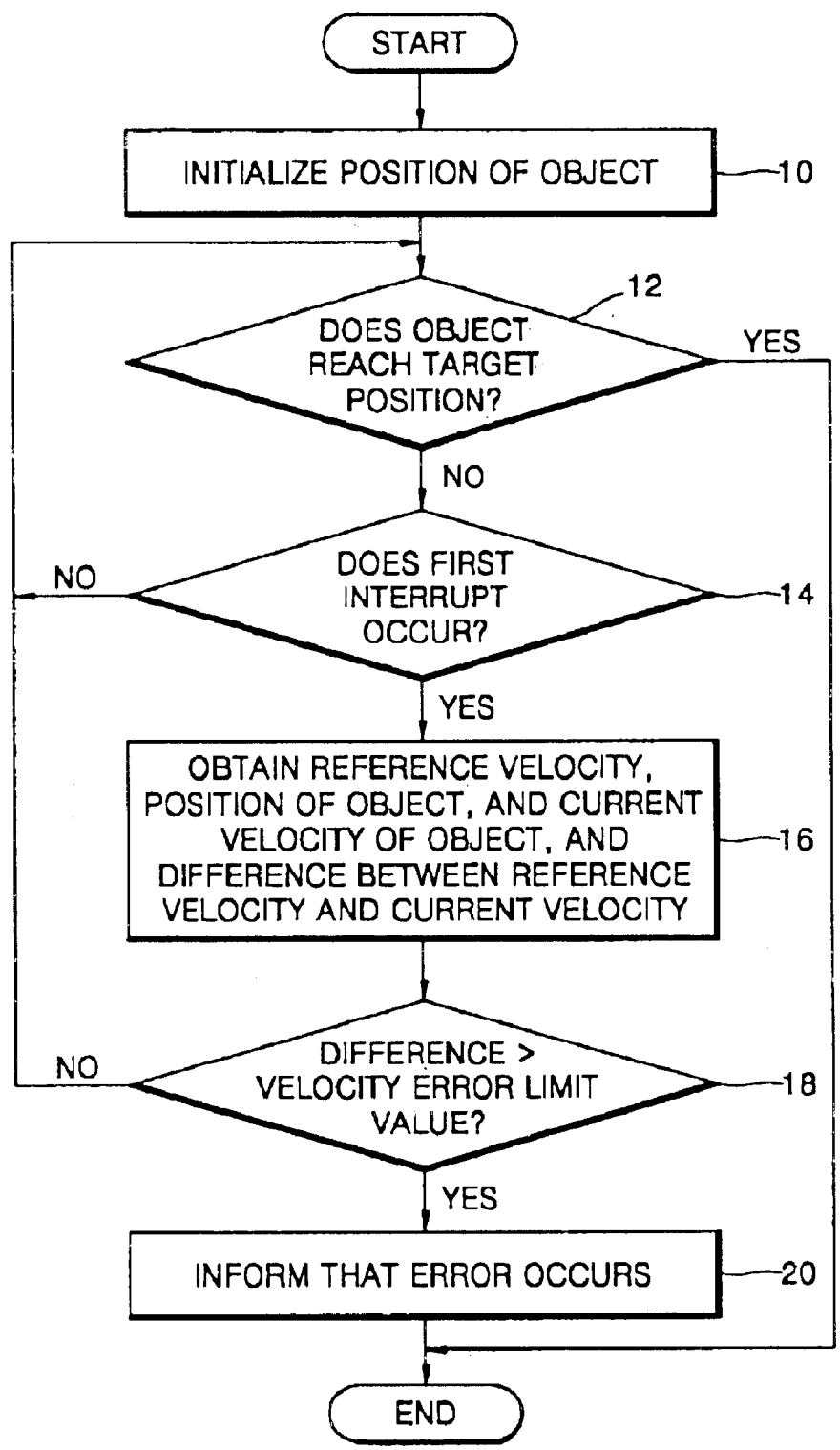
FIG. 1 is a flowchart of controlling a DC motor, according to an embodiment of the present invention.

Reference will now be made in detail to the present embodiments of the present invention, examples of which are illustrated in the accompanying drawings, wherein like reference numerals refer to the like elements throughout. The embodiments are described below to explain the present invention by referring to the figures.

FIG. 1 is a flowchart of controlling a DC motor, according to an embodiment of the present invention. The method comprises operations 10 through 16 of obtaining a difference between a reference velocity and a current velocity when a position of an object does not reach a target position and a first interrupt occurs, and operations 18 and 20 of informing a user of an error when the difference is greater than a velocity error limit value.

More particularly, at operation 10, the position of the object is initialized. After operation 10, in operation 12, it is checked whether the object, which is driven by the DC motor, reaches a target position. If, at operation 12, it is determined that the object reached the target position, the DC motor controlling method ends. That is, if, at operation 12, it is determined that the object reached the target position, the operation of the DC motor stops. If, at operation 12, it is determined that the object does not reach the target position, in operation 14, it is checked whether a first interrupt occurs.

Figure 2:
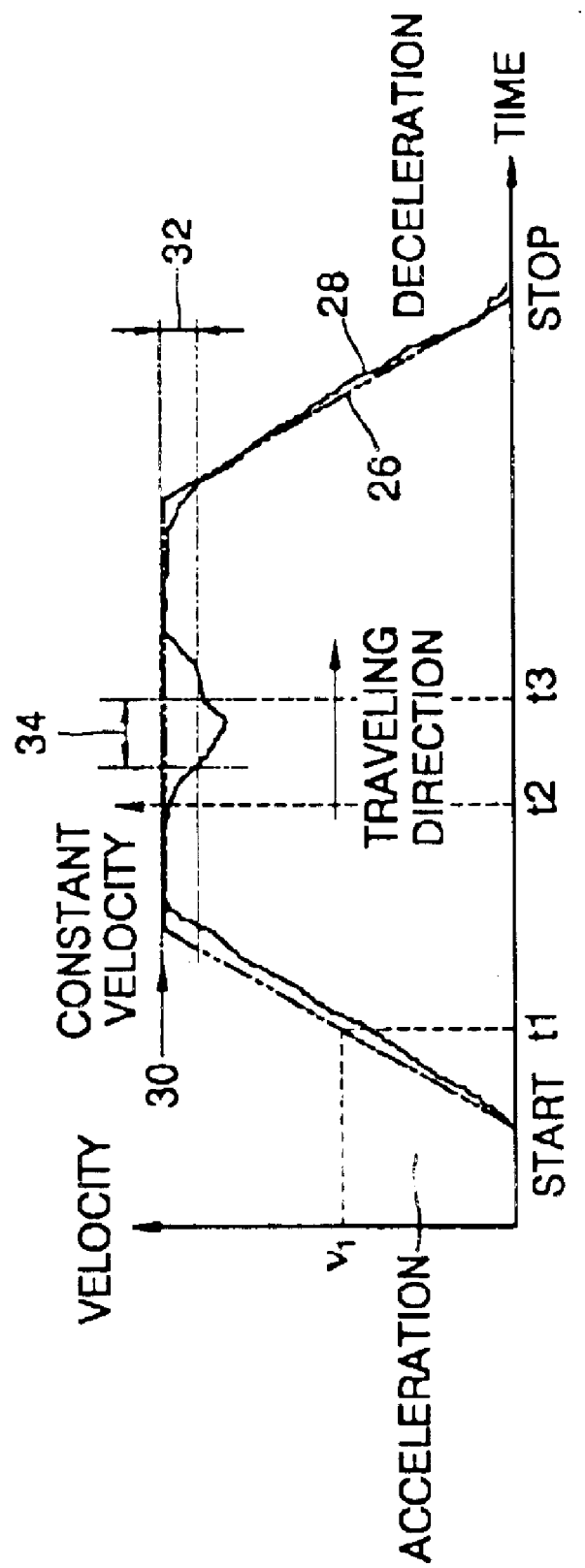
FIG. 2 is a graph of the trajectory of a predetermined velocity and the trajectory of an actual velocity of an object driven by the DC motor, according to an embodiment of the present invention.

FIG. 2 is a graph illustrating a predetermined velocity trajectory 26 and an actual (current) velocity trajectory 28 of the object driven by the DC motor, according to an embodiment of the present invention. Here, the vertical axis and the horizontal axis represent velocity and time, respectively. As shown in FIG. 2, it is assumed that the object accelerates as time lapses to reach a constant velocity, and then the object decelerates with the lapse of time.

If, at operation 14, it is determined that the first interrupt does not occur, the process returns to operation 12. However, if, at operation 14, it is determined that the first interrupt occurs, in operation 16, a reference velocity corresponding to a point of time when the first interrupt occurs is detected from the predetermined velocity trajectory 26, the position of the object is calculated, a current velocity of the object updated whenever a second interrupt occurs is calculated, and a difference between the reference velocity and the current velocity is obtained. According to an aspect of the present invention, the calculated current object velocity may be updated in relation to the time of the first interrupt by having, for example, the second interrupt occur more frequently than the first interrupt. In FIG. 2, if the first interrupt occurs at a point of a time $t_1$ shown in FIG. 2, the reference velocity is a velocity $v_1$. As the point of time $t_1$ increases and the first interrupt occurs, the reference velocity converges to a target velocity 30 in the predetermined velocity trajectory 26.

After operation 16, in operation 18, it is determined whether the difference between the reference velocity of the object and the current velocity 28 of the object is greater than a predetermined velocity error limit value. If, at operation 18, it is determined that the difference between the reference velocity of the object and the current velocity 28 of the object is not greater than the predetermined velocity error limit value, the process returns to operation 12.

However, if, at operation 18, it is determined that the difference between the reference velocity of the object and the current velocity 28 of the object is greater than the predetermined velocity error limit value, in operation 20, a user is informed that an error is occurring/has occurred. For example, referring to FIG. 2, when an external interference occurring at a time $t_2$ causes the actual velocity trajectory 28 to deviate from the predetermined velocity trajectory 26 (i.e., deviate from a calculated reference velocity at the time $t_2$, which is the target predetermined velocity trajectory 30), if, at operation 18, it is determined that the difference between the reference velocity 30 and the current velocity 28 is greater than a velocity error limit value 32, the user is informed that an error of the object, driven by the DC motor, is occurring (i.e., an object driving error has occurred). Thus, the user can perceive that an error has occurred. According to an aspect of the present invention, when, at operation 18, it is determined that the difference between the reference velocity and the current velocity 28 is greater than the velocity limit value 32 and the user is informed of the error occurrence, the operation of the DC motor may be stopped.

Figure 3:
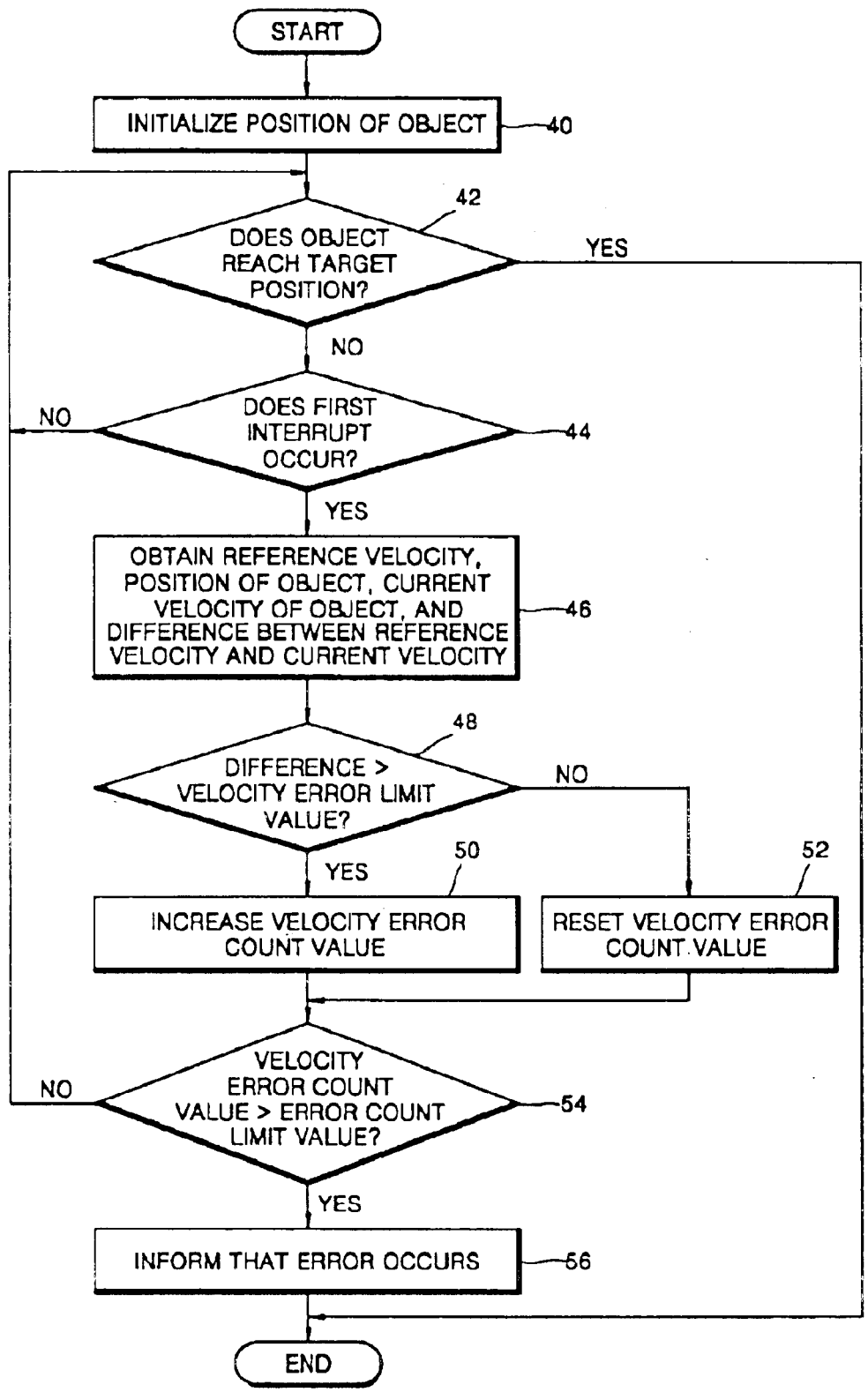
FIG. 3 is a flowchart of controlling a DC motor, according to another embodiment of the present invention.

FIG. 3 is a flowchart of controlling a DC motor according to another embodiment of the present invention. The method comprises operations 40, 42, 44, and 46 of obtaining a difference between a reference velocity and a current velocity when an object does not reach a target position and a first interrupt occurs, operations 48, 50, and 52 of obtaining a velocity error count value depending on a result of comparing the obtained difference with a velocity error limit value, and operations 54 and 56 of informing a user of an error when the velocity error count value is greater than an error count limit value. In particular, operations 40, 42, 44, 46, and 48 of FIG. 3 correspond to operations 10, 12, 14, 16, and 18 of FIG. 1, respectively, and identical operations are performed therein. Thus, descriptions of operations 40, 42, 44, 46, and 48 will not be repeated here.

In FIG. 3, if, at operation 48, it is determined that the difference between the reference velocity and the current velocity 28 is greater than the velocity error limit value, in operation 50, the velocity error count value is increased. For example, referring to FIG. 2, when the external interference occurring at the time $t_2$ causes the actual velocity trajectory 28 to deviate from the predetermined velocity trajectory 26 (i.e., deviate from a calculated reference velocity at the time $t_2$, which is the target predetermined velocity trajectory 30), if, at operation 48, it is determined that the difference between the reference velocity 30 and the actual velocity 28 is greater than the velocity error limit value 32, the velocity error count value is increased. However, if, at operation 48, it is determined that the difference between the reference velocity and the current velocity 28 is not greater than the velocity error limit value, in operation 52, the velocity error count value is reset.

After operation 50 or 52, in operation 54, it is determined whether the velocity error count value is greater than the error count limit value. According to this embodiment of the invention, the velocity error count value represents a period of time for which an error in the velocity of the object lasts, so that the velocity error limit value and the error count limit value can be determined/adjusted depending on how sensitively the error of the object should be detected.

If, at operation 54, it is determined that the velocity error count value is not greater than the error count limit value, the process returns to operation 42. However, if, at operation 54, it is determined that the velocity error count value is greater than the error count limit value, in operation 56, the user is informed that an error is occurring. For example, referring to FIG. 2, if, at operation 54, it is determined that the time $t_2$–$t_3$ for which the error in the velocity of the object lasts is greater than the error count limit value 34, at operation 56, the user is informed at a point of time $t_3$ that the error of the object has occurred.

According to an aspect of the present invention, in the DC motor controlling method shown in FIG. 3, if, at operation 42, it is determined that the object controlled by the DC motor reaches the target position, the operation of the DC motor may stop. Also, in the DC motor controlling method shown in FIG. 3, if, at operation 54, it is determined that the velocity error count value is greater than the error count limit value, at operation 56, the user is informed that the error is occurring and the operation of the DC motor can be stopped.

Figure 4:
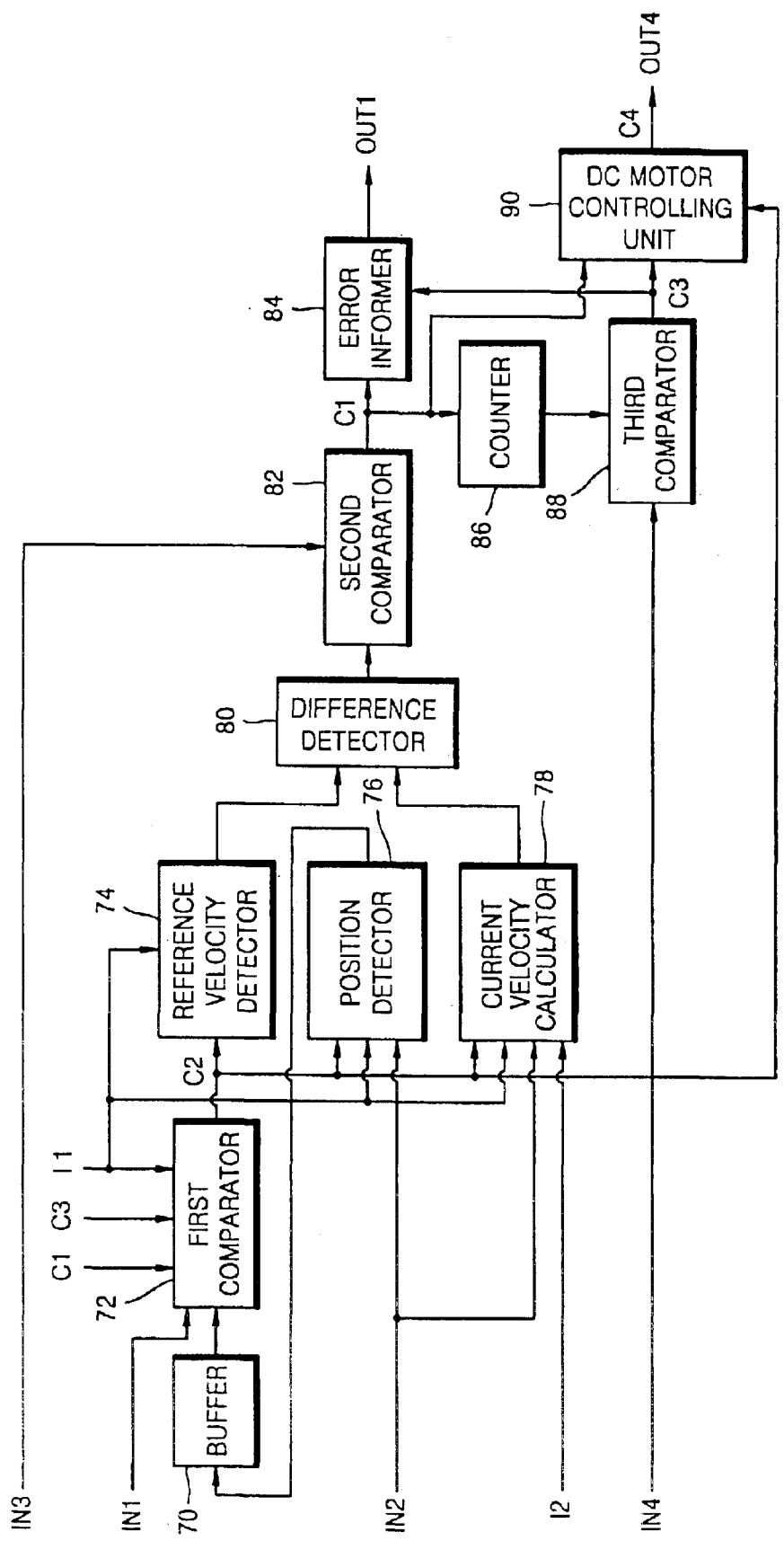
FIG. 4 is a control block diagram of an apparatus performing the method of controlling the DC motor as shown in FIGS. 1 and 3, according to an embodiment of the present invention.

FIG. 4 is a control block diagram of an apparatus performing/implementing the method of controlling the DC motor as shown in FIGS. 1 and 3, according to an embodiment of the present invention. In particular, typically, an ink jet printer incorporates the apparatus shown in FIG. 4 to control a DC motor driving a print head as the object. The apparatus comprises a buffer 70, a first comparator 72, a reference velocity detector 74, a position detector 76, a current velocity calculator 78, a difference detector 80, a second comparator 82, an error informer 84, a counter 86, a third comparator 88, and a motor controlling unit 90.

First, the buffer 70 buffers the position of the object driven by the DC motor and outputs the buffered result to the first comparator 72. Here, to perform operation 10 of FIG. 1 or operation 40 of FIG. 3, the buffer 70 is initialized to an initial state with a position of the object driven by the DC motor. Thus, at initialization the position of the object is input to the first comparator 72.

To perform operation 12, the first comparator 72 compares a target position of the object input via an input port IN1 with the position of the object input from the buffer 70 in response to a first control signal C1 input from the second comparator 82 or a first interrupt signal I1, and outputs the comparison result as a second control signal C2. Therefore, the second control signal C2 indicates whether the object has reached its target position in a time period. In particular, the first control signal C1 is output at operation 18, if no object driving error is detected to continue such an error checking. Here, the first interrupt signal I1 occurs at every predetermined period of time. Also, to perform operation 42, the comparator 72 compares the target position with the position of the object in response to a third control signal C3 input from the third comparator 88 or the first interrupt signal I1, and outputs the comparison result as a second control signal C2. In particular, the third control signal C3 is output of operation 54, if no object driving error is detected to continue such an error checking. Therefore, when the first comparator 72 perceives through the first interrupt signal I1 that the first interrupt does not occur, the first comparator 72 compares the target position input via the input port IN1 with the position of the object input from the buffer 70 and outputs the comparison result as the second control signal C2.

To carry out operation 16 or 46, the apparatus shown in FIG. 4 comprises the reference velocity detector 74, the position detector 76, the current velocity calculator 78, and the difference detector 80. Here, the reference velocity detector 74 detects a reference velocity corresponding to a point of time when the first interrupt occurs from the predetermined velocity trajectory 26 shown in FIG. 2 in response to the second control signal C2 input from the first comparator 72 and the first interrupt signal I1. For example, if the reference velocity detector 74 perceives through the second control signal C2 that the object does not reach the target position and through the first interrupt signal I1 that the first interrupt occurs, the reference velocity detector 74 detects from the predetermined velocity trajectory 26 the reference velocity corresponding to the point of time when the first interrupt occurs and outputs the detected reference velocity to the difference detector 80.

Also, at operation 16 or 46, the position detector 76 detects the position of the object in response to the second control signal C2 input from the first comparator 72 and the first interrupt signal I1, and outputs the detected position of the object to the buffer 70. For example, if the position detector 76 perceives through the second control signal C2 that the object does not reach the target position and through the first interrupt signal I1 that the first interrupt occurs, the position detector 76 detects the position of the object. Therefore, the buffer 70 updates the previously received position of the object whenever the buffer 70 receives the position of the object from the position detector 76 and outputs the updated position of the object to the first comparator 72.

Also, at operation 16 or 46, the current velocity calculator 78 calculates an updated current velocity of the object whenever a second interrupt occurs in response to the second control signal C2 input from the first comparator 72 and the first interrupt signal I1, and outputs the calculated current velocity of the object to the difference detector 80. For example, if the current velocity calculator 78 perceives through the second control signal C2 that the object does not reach the target position and through the first interrupt signal I1 that the first interrupt occurs, the current velocity calculator 78 calculates the current velocity of the object and updates the calculated current velocity whenever the second interrupts I2 occurs. In particular, according to an aspect of the invention, the current object velocity may be updated in relation to the time of the first interrupt by having, for example, the second interrupt I2 occur more frequently than the first interrupt. If the second interrupt I2 occurs at a same rate as the first interrupt, the current velocity calculator 78 calculates a current object velocity and the second interrupt I2 may be omitted. The difference detector 80 calculates a difference between the reference velocity input from the reference velocity detector 74 and the current velocity input from the current velocity calculator 78 and outputs the difference to the second comparator 82.

More particularly, if the object driven by the DC motor is an inkjet printer head or a carrier of a multi-function peripheral, the position detector 76 receives a square wave signal from an encoder sensor (not shown) via an input port IN2, and the position detector 76 detects the position of the carrier. Further, the current velocity calculator 78 calculates a current velocity of the carrier using the square wave signal. Here, the encoder sensor senses the movement of the carrier and outputs the sensed result as the square wave signal to the position detector 76 and the current velocity calculator 78, respectively. The square wave signal contains information on the position and velocity of the carrier.

In FIGS. 1 and 3, to perform operation 18 or 48, the second comparator 82 compares the difference input from the difference detector 80 with a velocity error limit value input from an input port IN3 and outputs the comparison result as the first control signal C1 to the error informer 84. To perform operation 20, the error informer 84 informs a user via an output port OUT1 that an error has occurred in response to the first control signal C1 input from the second comparator 82. For example, if the error informer 84 perceives through the first control signal C1 input from the second comparator 82 that the difference between the reference velocity and the current velocity is greater than the velocity error limit value, the error informer 84 informs the user via the output port OUT1 that an error of the object is occurring. If it is perceived through the first control signal C1 input from the second comparator 82 that the difference between the reference velocity and the current velocity is not greater than the velocity error limit value, the DC motor control process continues with the first comparator 72 comparing the position of the object with the target position in response to the first control signal C1 from the second comparator 82 (i.e., to perform operation 12).

According to the alternative embodiment of FIG. 3, to perform operation 50 or 52, the counter 86 performs a counting operation or is reset in response to the first control signal C1 input from the second comparator 82 and outputs the counted result as a velocity error count value to the third comparator 88. For example, if the counter 86 perceives through the first control signal C1 input from the second comparator 82 that the difference between the reference velocity and the current velocity is greater than the velocity error limit value, the counter 86 performs the counting operation to increase the velocity error count value. However, if the counter 86 perceives through the first control signal C1 input from the second comparator 82 that the difference between the reference velocity and the current velocity is not greater than the velocity error limit value, the counter 86 resets the counted result, i.e., the velocity error count value.

In FIG. 3, to perform operation 54, the third comparator 88 compares the velocity error count value input from the counter 86 with an error count limit value input from an input port IN4 and outputs the comparison result as a third control signal C3. Here, if it is perceived through the third control signal C3 input from the third comparator 88 that the velocity error count value is not greater than the error count limit value, the DC motor control process continues with the first comparator 72 comparing the position of the object with the target position, in response to the third control signal C3 from the third comparator C3 (i.e., to perform operation 42).

In FIG. 3, to perform operation 56, the error informer 84 informs the user that the error occurs in response to the third control signal C3 input from the third comparator 88. For example, if the error informer 84 perceives through the third control signal C3 that the error count value is greater than the error count limit value, the error informer 84 informs the user via the output port OUT1 that the error of the object is occurring.

According to an aspect of the present invention, the apparatus shown in FIG. 4 may further comprise a motor controlling unit 90. Here, the motor controlling unit 90 generates a fourth control signal C4 in response to the first control signal C1 input from the second comparator 82, the second control signal C2 input from the first comparator 72 or the third control signal C3 input from the third comparator 88, and outputs the fourth control signal C4 to a DC motor (not shown) via an output port OUT2. Thus, if it is perceived through the fourth control signal C4 that the object reaches the target position (i.e., the second control signal C2 indicates that the object has reached the target position), or the velocity limit value has been exceeded, or the velocity error count value is greater than the error count limit value, the operation of the DC motor stops.

Figure 5:
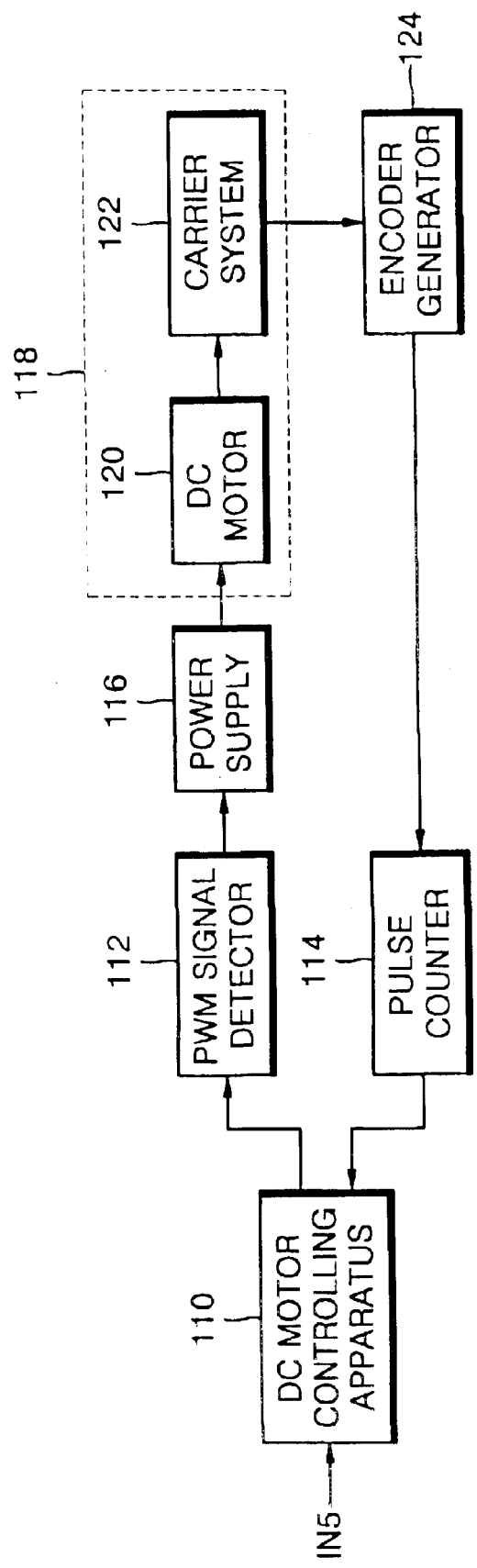
FIG. 5 is a control block diagram of an inkjet printer or a multi-function peripheral using the apparatus shown in FIG. 4, according to an embodiment of the present invention.

The above-described method and apparatus for controlling a DC motor according to the present invention can be applied to an inkjet printer or a multi-function peripheral to control a DC motor driving a carrier having an inkjet head as the object. FIG. 5 is a control block diagram of an inkjet printer or a multi-function peripheral using the apparatus shown in FIG. 4. The inkjet printer or the multi-function peripheral of FIG. 5 comprises a DC motor controlling apparatus 110, a PWM signal generator 112, a pulse counter 114, a power supply 116, a plant 118, and an encoder generator 124. Here, the plant 118 comprises a DC motor 120 and a carrier system 122.

The DC motor 120 drives the carrier system 122, and the carrier system 122 is composed of peripheral devices, such as a carrier on which an inkjet head is mounted, an encoder stripper, and the like. Here, the encoder generator 124 (encoder sensor) generates a square wave signal containing information on the velocity and position of the carrier using a line stripper. The square wave signal is input to the position detector 76 and the current velocity calculator 78 via the input part IN2, as shown in FIG. 4. The pulse counter 114 performs a counting operation in response to the square wave signal. The DC motor controlling apparatus 110 comprises the DC motor controlling apparatus shown in FIG. 4. The DC motor controlling apparatus 110 detects a carrier system velocity error and control the PWM detector 112 to generate an optimum PWM signal, which is output to the power supply 116, using the counted result of the pulse container 114 containing information on the velocity and position of the carrier at every predetermined period. The power supply 116 supplies power to the DC motor 120 in response to the PWM signal. The DC motor 120 drives the carrier system 122 in response to power supplied from the power supply 116.

As described above, unlike a conventional method and a conventional apparatus sensing an error of a motor driven object using only changes in the position of the object, in the present invention, an error of a motor driven object that lasts for a predetermined period of time and deviates from a predetermined level can be sensitively sensed using a velocity and a position of the object based on a predetermined velocity error limit value and/or an error count limit value calculated at every predetermined period of time, i.e., whenever a first interrupt occurs, thereby detecting a driven object velocity error based upon a time period. Also, when the error is sensed, the operation of the DC motor can be stopped. Thus, the DC motor and the object driven by the DC motor can be protected from an external interference and unnecessary power consumption can be prevented. In addition, in the case of printers, many conventional problems, such as a paper tear, occurring due to a continuous increase in duty cycle of a PWM signal even when the position of the object does not vary, can be solved.

The present invention provides controlling a direct current motor driving an object by determining, if the object does not reach a target position (i.e., until the object reaches a target position) and at every predetermined period of time (e.g., interrupt occurrences), a reference velocity corresponding to a point of time from a predetermined velocity trajectory, obtaining a position of the object, calculating a current velocity of the object, and calculating a difference between the reference velocity and the current velocity. If the calculated difference is greater than a velocity error limit value, a user is informed that an error has occurred. Therefore the present invention provides detecting a driven object error according to the object velocity in a time period. More particularly, the present invention provides a DC motor controlling apparatus/system generating an optimum PWM signal to drive a DC motor system (e.g., a DC motor and a carrier/object), the optimum PWM signal also comprising DC motor driving velocity error signals to the DC motor system, for example, to stop the DC motor system in case of a DC motor velocity error. According to an aspect of the invention the comparing at operations 18, 48 and 54 may also include the velocity difference equaling the error limit values. The processes of the present invention as embodied in the DC motor controlling apparatus 110 may be implemented in computing hardware and/or software.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method of controlling a direct current motor driving an object, the method comprising:
    if the object does not reach a target position, detecting from a predetermined velocity trajectory a reference velocity corresponding to a point of time when a first interrupt occurs, obtaining a position of the object, calculating a current velocity of the object updated whenever a second interrupt occurs, and calculating a difference between the reference velocity and the current velocity;
    determining whether the difference is greater than a velocity error limit value; and
    if determined that the difference is greater than the velocity error limit value, informing a user of an error occurrence.

2. The method of claim 1, wherein detecting the reference velocity, obtaining the object position, and calculating the current velocity and the difference, comprises:
    initializing the position of the object;
    determining whether the object reaches the target position;
    if determined that the object does not reach the target position, determining whether the first interrupt occurs; and
    if determined that the first interrupt occurs, calculating the reference velocity, the position of the object, the current velocity, and the difference.

3. The method of claim 1, wherein the second interrupt occurs more frequently than the first interrupt.

4. The method of claim 1, further comprising:
    if determined that the difference is greater than the velocity error limit value, increasing a velocity error count value;
    if determined that the difference is not greater than the velocity error limit value, resetting the velocity error count value;
    after the increasing or the resetting of the velocity error count value, determining whether the velocity error count value is greater than an error count limit value; and
    if determined that the velocity error count value is greater than the error count limit value, informing the user of the error occurrence.

5. The method of claim 4, further comprising, if determined that the object reaches the target position or the velocity error count value is greater than the error count limit value, stopping the direct current motor.

6. The method of claim 1, further comprising, adjusting the velocity error limit value to adjust a sensitivity of the error detection.

7. The method of claim 4, further comprising, adjusting the error count limit value to adjust a sensitivity of the error detection.

8. An apparatus controlling a direct current motor driving an object, the apparatus comprising:
    a buffer buffering and outputting a position of the object;
    a first comparator comparing a position of the object input from the buffer with a target position in response to a first control signal or a first interrupt signal and outputting a comparison result as a second control signal;
    a reference velocity detector detecting from a predetermined velocity trajectory a reference velocity corresponding to a point of time when the first interrupt signal occurs, in response to the second control signal and the first interrupt signal;
    a position detector detecting the position of the object in response to the second control signal and the first interrupt signal and outputting the detected position of the object to the buffer as an updated position;
    a current velocity calculator calculating a current velocity of the object updated whenever a second interrupt signal occurs, in response to the second control signal and the first interrupt signal;
    a difference detector calculating and outputting a difference between the reference velocity and the current velocity;
    a second comparator comparing the difference with a velocity error limit value and outputting a comparison result as the first control signal; and
    an error informer informing a user of an error occurrence in response to the first control signal,
    wherein the second interrupt signal occurs more frequently than the first interrupt signal.

9. The apparatus of claim 8, further comprising:
    a counter counting or resetting a velocity error count value in response to the first control signal; and
    a third comparator comparing the velocity error count value with an error count limit value and outputting a comparison result as a third control signal,
    wherein the error informer informs the user of the error occurrence in response to the third control signal.

10. The apparatus of claim 9, further comprising a motor controller that generates a fourth control signal in response to one of the first control signal, the second control signal and the third control signal,
    wherein the direct current motor is stopped in response to the fourth control signal.

11. An inkjet printer, comprising:
    a direct current (DC) motor driving a carrier system; and
    a DC motor controller controlling the DC motor and detecting a DC motor driving velocity error according to the carrier system velocity and position sensitiveness.

12. The inkjet printer of claim 11, wherein the DC motor driving velocity error is detected by checking the carrier system velocity at timed interrupt occurrences and based upon a target velocity at the timed interrupt occurrences.

13. A controller controlling a direct current motor driving an object, comprising:
    an object velocity checker determining, until the object reaches a target position and upon timed interrupt occurrences, a target velocity corresponding to a point of time at the timed interrupt occurrences, obtaining a position of the object, calculating a current velocity of the object, and calculating a difference between the target velocity and the current velocity;
    a velocity error detector determining if the calculated difference is greater than a velocity error limit value as a velocity error difference; and an error informer informing a user of an object velocity error, if the velocity error difference is greater than the error limit value and stopping the motor.

14. The controller of claim 13, wherein the velocity error detector comprises an adjuster adjusting the velocity error limit value to control a sensitivity of the error detection.

15. An apparatus controlling a direct current motor driving an object, the apparatus comprising:

a reference velocity detector detecting from a predetermined velocity trajectory a reference velocity of the object corresponding to a point of time when a first interrupt signal occurs;

a current velocity calculator calculating a current velocity of the object in response to the first interrupt signal;

a difference detector calculating a difference between the reference velocity and the current velocity;

a comparator comparing the velocity difference with a velocity error limit value as a velocity error difference; and an error informer informing a user of an error occurrence depending upon the velocity error difference.

16. The apparatus of claim 15, wherein the current velocity of the object is updated upon occurrence of a second interrupt signal more frequently than the first interrupt signal.

* * * * *

UNITED STATES PATENT AND TRADEMARK OFFICE
CERTIFICATE OF CORRECTION

PATENT NO. : 6,831,438 B2
DATED : December 14, 2004
INVENTOR(S) : Yong-do Jung

It is certified that error appears in the above-identified patent and that said Letters Patent is hereby corrected as shown below:

<u>Title page</u>,
Item [75], Inventors, change "Young-do Jung, Gyconggi-doi, (KR)" to
-- Young-do Jung, Gyeonggi-do, (KR) --.

Signed and Sealed this

Seventeenth Day of May, 2005

JON W. DUDAS
*Director of the United States Patent and Trademark Office*